United States Patent [19]

Horning et al.

[11] 4,433,036
[45] Feb. 21, 1984

[54] MULTICELL RESERVE BATTERY

[75] Inventors: Robert J. Horning, Doylestown; William J. Eppley, Skippack, both of Pa.

[73] Assignee: Honeywell Inc., Minneapolis, Minn.

[21] Appl. No.: 364,105

[22] Filed: Mar. 31, 1982

[51] Int. Cl.³ .................... H01M 6/36; H01M 6/38
[52] U.S. Cl. .................................. 429/114; 429/116
[58] Field of Search ............... 429/114, 115, 116, 117, 429/113

[56] References Cited

U.S. PATENT DOCUMENTS

| | | | |
|---|---|---|---|
| 2,787,650 | 4/1957 | Blaru | 136/90 |
| 2,918,515 | 12/1959 | Lawson | 136/90 |
| 3,211,588 | 10/1965 | Marsal | 136/90 |
| 3,432,359 | 3/1969 | Cleveland et al. | 136/90 |
| 3,432,360 | 3/1969 | Cleveland | 136/90 |
| 3,507,707 | 4/1970 | Biggar | 136/90 |
| 3,718,508 | 2/1973 | Levine | 429/114 |

Primary Examiner—Donald L. Walton
Assistant Examiner—Gerard P. Rooney, Jr.
Attorney, Agent, or Firm—Laurence J. Marhoefer

[57] ABSTRACT

A reserve battery having a plurality of galvanic cells and a series of ports through which electrolyte can flow into the cells. A spring activated valve opens the ports during periods of angular acceleration of the battery and closes the ports when there is no acceleration.

2 Claims, 2 Drawing Figures

FIG. 1
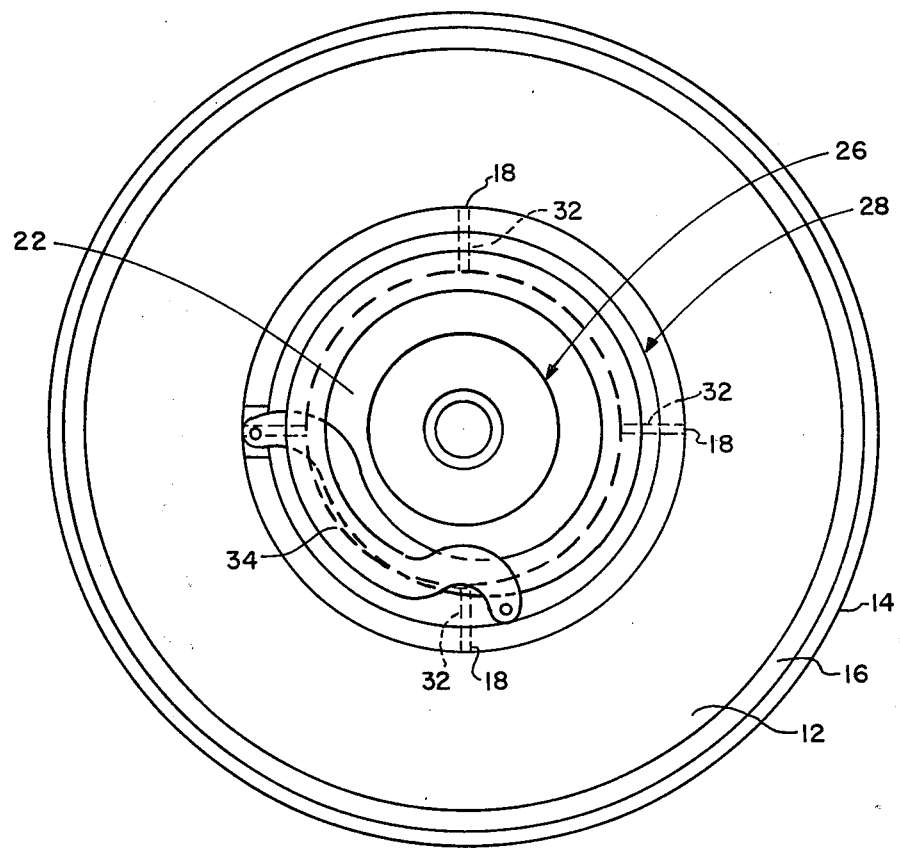
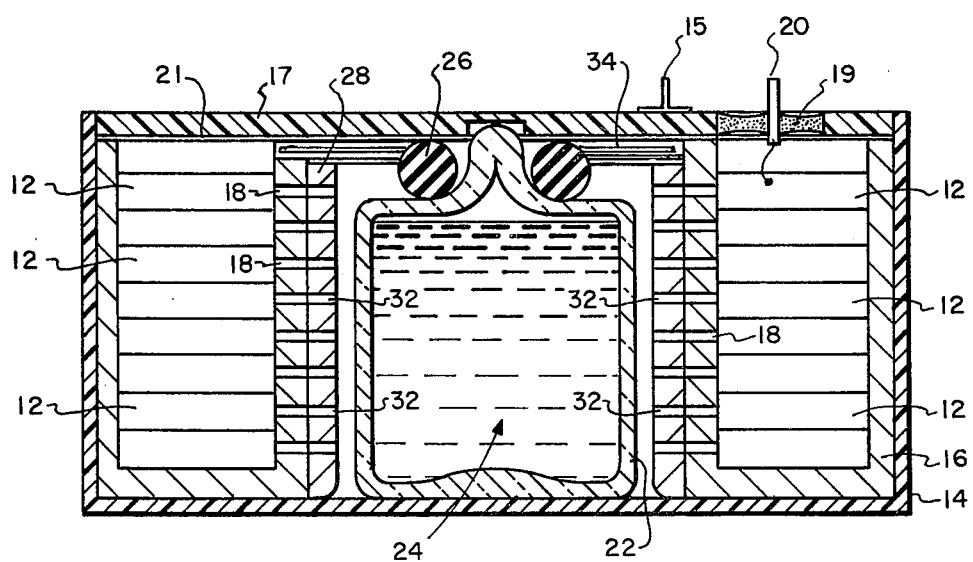
FIG. 2

MULTICELL RESERVE BATTERY

This invention relates to an improved reserve battery for use in rotating projectiles, and more particularly to an improved mechanism for delivering a fluid electrolyte to the galvanic elements of a multicell battery system.

BACKGROUND

The prior art has a myriad of approaches to the problem of delivering a liquid electrolyte to the elements of a multicell battery after a projectile has been launched. Usually the acceleration forces generated at launch or firing are used to rupture an ampul, and in the case of a rotating projectile, centrifugal force causes the electrolyte to flow into the cells. As will be appreciated by those skilled in the art, the galvanic elements are kept out of contact with the electrolyte until the cell is placed in service in order to provide a long shelf life and as a safety feature.

It is desirable to energize all of the cells of a multicell system from a single source of electrolyte. In prior art multicell batteries for use in projectiles it is difficult to prevent leakage currents between cells; such leakage currents rob energy from the system and are thus deleterious to its proper operation. In addition, in a reserve battery it is difficult to keep the electrolyte in the cells after the projectile has come to rest, as for example in a land mine.

An object of this invention is the provision of a simple, inexpensive mechanism for delivering electrolyte in a multicell reserve battery which mechanism: (a) helps prevent intercell leakage current after activation; (b) permits the use of excess electrolyte to insure rapid and complete activation; and (c) prevents leakage of electrolyte after the projectile comes to rest.

SUMMARY OF THE INVENTION

Briefly, this invention contemplates the provision of a reserve multicell battery in which a valve surrounding the electrolyte is rotatable with respect to the interior wall of the cell casing. A spring urges the valve to a rest position relative to the wall. In this position a plurality of ports in the valve are misaligned with ports in the wall leading to the cells. Upon rotation acceleration of the projectile, the container moves relatively to the wall so that the ports align permitting electrolyte to flow into the cells. As rotational acceleration decreases, the spring moves the container back to its initial rest position blocking the cell ports and preventing the flow of electrolyte between the cells and intercell leakage currents.

DESCRIPTION OF THE DRAWINGS

FIG. 1 is a top view (with the cover plate removed) of the cell shown in FIG. 2.

FIG. 2 is a sectional side view of one embodiment of a multicell reserve battery in accordance with this invention.

DESCRIPTION OF THE PREFERRED EMBODIMENT

Referring now to FIGS. 1 and 2 of the drawings, one embodiment of multicell reserve battery in accordance with the teachings of this invention has eight toroidally shaped cells 12 stacked one on top of the other. An outer conductive casing 16 of a suitable insulating plastic material surrounds the cells and insulates them from a outer conductive housing 14. The housing 14 may serve as the negative or ground terminal for the cells; a terminal 15 is secured to the top 17 of the housing. An insulator 19 secures another terminal 20 to the top of the housing; but insulated therefrom. An insulator 21 extends across the lower surface of the top of the housing 14. The exemplary embodiment comprises eight bipolar cells; a lead connects the one side of the lower most cell to the housing and the other side of the top cell to terminal 20. The interior wall of casing 16 has a series of ports 18 through which electrolyte flows in order to activate the cells. As best can be seen in FIG. 2, there are a plurality of ports 18 in the casing wall through which electrolyte may flow into each cell—four in the illustrative embodiment.

A rubber ring 26 positions a frangible ampul 22 of a suitable material, such as glass, within the central cavity formed by the stacked toroidal cells 12. The ampul holds an electrolytic solution. The quantity of solution may be in excess of that which the cells can fully absorb insuring rapid and complete cell activation.

A cylindrical valve 28 nests within the plastic cell case 16 and fits snugly against the interior wall of the cell case, but is free to rotate with respect thereto. The cylindrical valve 28 has a series of ports 32 around its periphery; one port 32 for each of the ports 18 which communicate with the cells 12. One end of a resilient member 34 (i.e., a spring) is attached to the cylindrical valve 28 and its other end is attached to the insulating casing 16. The spring urges the valve 28 to a predetermined rest position with respect to case in which the ports 32 and 18 are misaligned. The rotational inertia of the cells 12, the insulating case 16, and the outer housing 14, is substantially greater than that of the cylindrical valve 28 so that angular acceleration of the battery about its vertical center line rotates valve 28 with respect to the wall. This causes ports 32 and 18 to come into alignment, as shown in the drawings. When the projectile reaches a constant rotational speed, the spring 30 returns the valve 28 back to its rest position (not shown) in which the ports 32 and 18 are misaligned. It will be appreciated that a fluid or mechanical damper may be added to the system if desired in order to slow movement of the valve from the aligned to misaligned position.

In operation, acceleration of battery when the projectile in which it is located is fired breaks the ampul, as in prior art reverse cells. Angular acceleration of the projectile causes the valve 28 to rotate with respect to the wall of the casing against the force of the spring so that the ports 32 and 18 come into alignment. The liquid electrolyte 24 flows into the cells 12 activating the battery. Angular acceleration decreases as the projectile comes up to its final rotational speed, and the spring 34 returns the cylinder 28 back to its rest position, thus blocking the ports 18 and preventing leakage currents between the cells even if there is an excess of electrolyte in the system. Thus, it will be appreciated that objectives of the invention have been accomplished. The valve helps prevent intercell leakage current, even if there is an excess of electrolyte in the system, to insure rapid and complete cell activation. Further it prevents leakage after the projectile has come to rest.

What is claimed is:

1. A reserve battery comprising in combination:
a plurality of galvanic cells;

a casing housing said plurality of cells, said casing including a wall with a plurality of ports formed therein said ports providing an entry through which an electrolyte can flow in order to activate said cells;

a reservoir for electrolyte;

a valve having a plurality of ports formed therein;

means supporting said valve between said wall and said reservoir to permit relative movement there between;

means urging said valve to a position relative to said wall where said wall ports and said valve ports are not aligned when the angular velocity of said battery is constant and permitting angular acceleration of said battery to cause said valve to move relative to said wall so that said valve ports and said wall ports come into alignment during angular acceleration of said battery.

2. A reserve battery as in claim 1 wherein said reservoir is a frangible ampule.

* * * * *